US012195685B2

(12) United States Patent
Berends et al.

(10) Patent No.: US 12,195,685 B2
(45) Date of Patent: Jan. 14, 2025

(54) PROCESS TO PREPARE A CHAR PRODUCT

(71) Applicant: TORRGAS TECHNOLOGY B.V., Amsterdam (NL)

(72) Inventors: Robert Hugo Berends, Deventer (NL); Robin Pieter Post Van Der Burg, Amsterdam (NL)

(73) Assignee: TORRGAS TECHNOLOGY B.V., Amsterdam (NL)

( * ) Notice: Subject to any disclaimer, the term of this patent is extended or adjusted under 35 U.S.C. 154(b) by 882 days.

(21) Appl. No.: 17/274,553

(22) PCT Filed: Sep. 13, 2019

(86) PCT No.: PCT/NL2019/050597
§ 371 (c)(1),
(2) Date: Mar. 9, 2021

(87) PCT Pub. No.: WO2020/055254
PCT Pub. Date: Mar. 19, 2020

(65) Prior Publication Data
US 2022/0048775 A1     Feb. 17, 2022

(30) Foreign Application Priority Data

Sep. 14, 2018   (WO) ................ PCT/NL2018/050604

(51) Int. Cl.
| | |
|---|---|
| *C10J 3/66* | (2006.01) |
| *C01B 3/32* | (2006.01) |
| *C01B 32/318* | (2017.01) |
| *C10B 47/00* | (2006.01) |
| *C10B 49/04* | (2006.01) |
| *C10B 53/02* | (2006.01) |
| *C10J 3/00* | (2006.01) |
| *C10J 3/84* | (2006.01) |
| *C10K 3/00* | (2006.01) |

(52) U.S. Cl.
CPC .................. *C10J 3/66* (2013.01); *C01B 3/32* (2013.01); *C01B 32/318* (2017.08); *C10B 47/00* (2013.01); *C10B 49/04* (2013.01); *C10B 53/02* (2013.01); *C10J 3/002* (2013.01); *C10J 3/84* (2013.01); *C10K 3/001* (2013.01); *C01B 2203/0255* (2013.01); *C01P 2006/12* (2013.01); *C10J 2300/0909* (2013.01); *C10J 2300/0916* (2013.01); *C10J 2300/1846* (2013.01); *C10J 2300/1884* (2013.01)

(58) Field of Classification Search
CPC .................................. C10J 3/00; C01B 32/318
See application file for complete search history.

(56) References Cited

U.S. PATENT DOCUMENTS

| | | |
|---|---|---|
| 4,220,454 A | 9/1980 | Ban et al. |
| 5,769,007 A | 6/1998 | Tratz et al. |
| 8,669,404 B2 | 3/2014 | Shulenberger et al. |
| 2015/0076411 A1 | 3/2015 | Ocfemia et al. |
| 2017/0114284 A1 | 4/2017 | Binder et al. |

FOREIGN PATENT DOCUMENTS

| | | |
|---|---|---|
| DE | 19720417 A1 | 11/1998 |
| WO | 2010130988 A1 | 11/2010 |
| WO | 2017160146 A1 | 9/2017 |

*Primary Examiner* — Peter F Godenschwager
(74) *Attorney, Agent, or Firm* — Nixon Peabody LLP; Ronald I. Eisenstein; Nicole D. Kling

(57) ABSTRACT

The invention is directed to a process to prepare a char product by pyrolysis or mild gasification of a solid biomass feed thereby obtaining a gaseous fraction comprising hydrogen, carbon monoxide and a mixture of gaseous organic compounds and a solid fraction comprising of char particles having a reduced atomic hydrogen over carbon ratio and a reduced oxygen over carbon ratio relative to the solid biomass feed. The solid biomass feed are pellets of a solid torrefied biomass feed. The pyrolysis or mild gasification is performed at a temperature of between 500 and 800° C. and at a solid residence time of between 10 and 60 minutes.

11 Claims, 1 Drawing Sheet

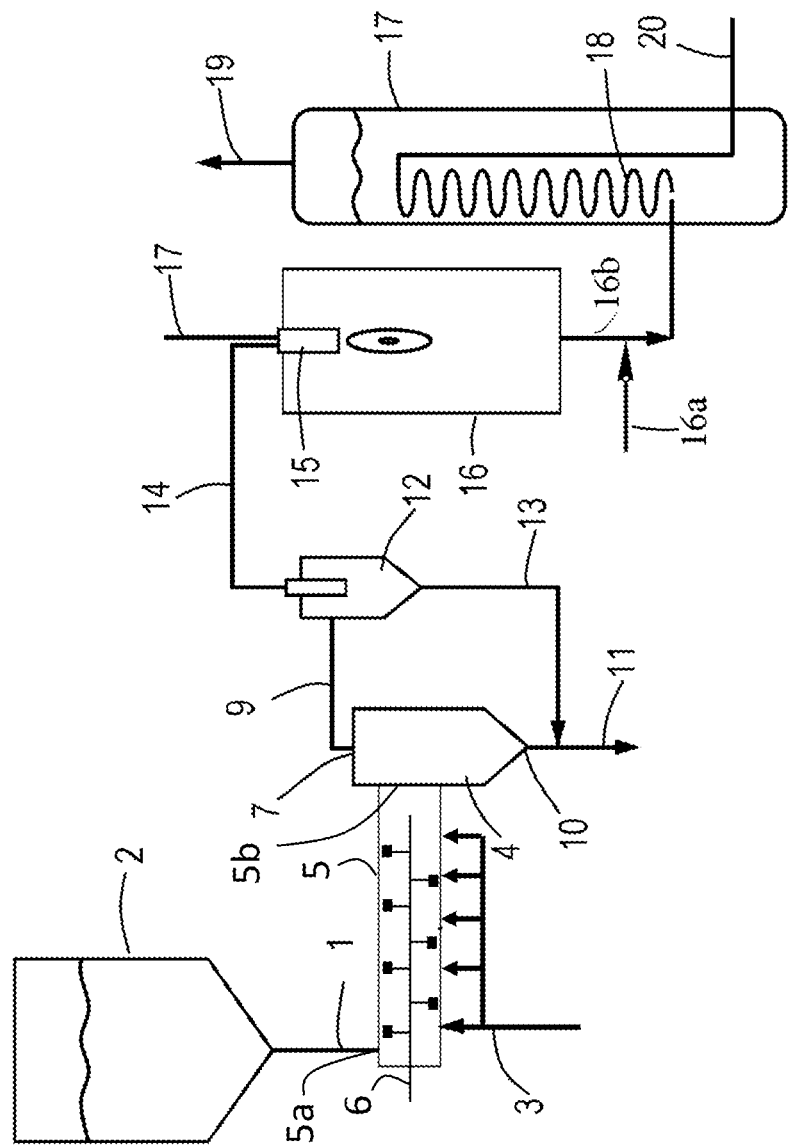

PROCESS TO PREPARE A CHAR PRODUCT

CROSS-REFERENCE TO RELATED APPLICATIONS

This application is a 35 U.S.C. § 371 National Phase Entry Application of International Application No. PCT/NL2019/050597 filed Sep. 13, 2019, which designates the U.S. and claims benefit under 35 U.S.C. § 119(a) of International Application No. PCT/NL2018/050604 filed Sep. 14, 2018, the contents of which are incorporated herein by reference in their entireties.

The invention is directed to a process to prepare a char product.

WO2017/160146 describes a process wherein a powdered torrefied biomass is subjected to a fast pyrolysis at relatively low temperatures of between 750 and 1000° C. and at a residence time of less than 2 seconds. The char product is separated from a gaseous reaction product. The gaseous reaction product contains hydrogen and carbon monoxide and gaseous hydrocarbons. This gaseous reaction product is subsequently partially oxidised at a temperature of above 1100° C. to obtain syngas, a mixture comprising of hydrogen and carbon monoxide. The advantage of such a char process is that also a feedstock is produced from which syngas may be prepared. Unlike other syngas manufacturing processes no slag is formed. These slag forming compounds remain in the solid char product. This allows one to perform the subsequent partial oxidation of the gaseous reaction product at the more elevated temperatures. A problem of this process is that a char product is obtained having a high volatiles content of more than 10 wt. %. Such a char product cannot be used in many applications, such as the typical applications for active carbon.

The aim of the present invention is to provide for a process which prepares a char product having a lower volatiles content. This aim is achieved by the following process. Process to prepare a char product by pyrolysis or mild gasification of a solid biomass feed thereby obtaining a gaseous fraction comprising hydrogen, carbon monoxide and a mixture of gaseous organic compounds and a solid fraction comprising of char particles having a reduced atomic hydrogen over carbon ratio and a reduced oxygen over carbon ratio relative to the solid biomass feed and wherein the solid biomass feed are pellets of a solid torrefied biomass feed and wherein the pyrolysis or mild gasification is performed at a temperature of between 500 and 800° C. and at a solid residence time of between 10 and 60 minutes.

Applicants found that when pellets of a solid torrefied biomass feed are used as feed and when the pyrolysis or mild gasification is performed at a longer residence time a char product is obtained having a significantly lower volatiles content. Further the yield of the gaseous reaction products increases as compared to the prior art process. Thus the potential to prepare for example more syngas from this gaseous product increases. Further the quality of the char product, with respect to active surface, improves.

Applicants found that when a pellet of a torrefied biomass feed is used a char product is obtained which can be used in various applications, such a soil enhancer, activated carbon, filler in engineered plastics, metallurgical coal or can be easily converted in products having favourable end uses. In the process of the invention a considerable amount of the carbon as present in the torrefied biomass feed is converted to gaseous hydrocarbons and eventually to the desired hydrogen and carbon monoxide. The remaining char particle will comprise ash forming compounds and carbon. By isolating the char and thus also isolating the ash forming as composed within the char from the gaseous reaction products it is possible to subject these gaseous reaction products to higher temperature downstream processes without the risk that undesired slag will form. Such a downstream process is preferably a partial oxidation process wherein the gaseous organic compounds may be further converted to hydrogen and carbon monoxide. Such a higher temperature favours the conversion of the hydrocarbons such as the gaseous tar compounds, which may be present in the gaseous reaction products, to hydrogen and carbon monoxide. Because the ash forming compounds remains within the char product formation of molten slag is thus avoided in such a partial oxidation process. The gaseous reaction products may also be used as fuel in a combustion process, such as an oxyfuel combustion process.

The process shall be described in more detail below.

BRIEF DESCRIPTION OF THE DRAWINGS

FIG. 1 shows a process line up suited for the process according to the invention.

The solid biomass feed has been obtained by torrefaction of a starting material comprising lignocellulosic material. Such a process not only increases the heating value per mass biomass by torrefaction but may also remove a substantial amount of water, especially so-called bound-water, from the starting material comprising lignocellulosic material, further also referred to as biomass material. The energy density of the biomass material is increased by decomposing all or part of the hemicelluloses as present in the biomass. An advantage of using a torrefied biomass feed is that the properties of torrefied biomass feeds obtained from different biomass sources may be more uniform than the properties of the original biomass sources. This simplifies the operation of the process according to the invention.

Torrefaction is a well-known process and for example described in WO2012/102617 and in the earlier referred to publication of Prins et al. in Energy and is sometimes referred to as roasting. In such a process the biomass is heated to an elevated temperature, suitably between 260 and 310° C. and more preferably between 250 and 290° C., in the absence of oxygen. Torrefaction conditions are so chosen that hemicelluloses decomposes while keeping the celluloses and lignin intact. These conditions may vary for the type of biomass material used as feed. The temperature and residence time of the torrefaction process is further preferably so chosen that the resulting material has a high content of so-called volatiles, i.e. organic compounds. The solids residence time is suitably at least 5 and preferably at least 10 minutes. The upper residence time will determine the amount of volatiles which remain in the torrefied biomass. Preferably the content of volatiles is between 50 and 80 wt %, more preferably between 60 and 80 wt % and even more preferably between 65 and 75 wt %. The volatile content is measured using DIN 51720-2001-03. Applicants found that the relatively high volatile content in the torrefied biomass is advantageous to achieve a more carbon efficient process from biomass to the char product and the gaseous fraction.

In the torrefaction process the atomic hydrogen over carbon (H/C) ratio and the atomic oxygen over carbon (O/C) ratio of the biomass material is reduced. Preferably the pellets of a solid torrefied biomass feed have an atomic oxygen over carbon (O/C) ratio of between 0.4 and 0.6. Further the water content will reduce in a torrefaction process. The pellets of a solid torrefied biomass suitably contains less than 7 wt %, and more preferably less than 4 wt % water, based on the total weight of the solid torrefied biomass.

The biomass material to be torrefied may be any material comprising hemicellulose including virgin biomass and waste biomass. Virgin biomass includes all naturally occurring terrestrial plants such as trees, i.e. wood, bushes and grass. Waste biomass is produced as a low value by-product of various industrial sectors such as the agricultural and forestry sector. Examples of agriculture waste biomass are corn stover, sugarcane bagasse, beet pulp, rice straw, rice hulls, barley straw, corn cobs, wheat straw, canola straw, rice straw, oat straw, oat hulls and corn fibre. A specific example is palm oil waste such as oil palm fronds (OPF), roots and trunks and the by-products obtained at the palm oil mill, such as for example empty fruit bunches (EFB), fruit fibers, kernel shells, palm oil mill effluent and palm kernel cake. Examples of forestry waste biomass are saw mill and paper mill discards. For urban areas, the best potential plant biomass feedstock includes yard waste (e.g., grass clippings, leaves, tree clippings, and brush) and vegetable processing waste. Waste biomass may also be Specified Recovered Fuel (SRF) comprising lignocellulose.

The biomass material to be torrefied may be a mixture originating from different lignocellulosic feedstocks. Furthermore, the biomass feed may comprise fresh lignocellulosic compounds, partially dried lignocellulosic compounds, fully dried lignocellulosic compounds or a combination thereof.

The pellets of a solid torrefied biomass feed may be obtained by pressing the torrefied powder into a shape. Such pellets may have any shape, such as cylinders, pillow shape like in briquettes, cubes. Preferably the smallest distance from the surface of such a pellet to its centre is less than 10 mm. This is advantageous for mass transport within the pellet while performing the pyrolysis or mild gasification process. For example a suitable pellet may have the shape of a cylinder suitably having a diameter of between 5 and 12 mm and preferably between 5 and 10 mm. The length of such cylinders may be between 5 and 50 mm, preferably between 40 and 80 mm and more preferably between 40 and 70 mm. These pellets can be directly used as feed to the present process or may be reduced in size by means of a simple ball milling or hammermilling process.

Applicants found that when pellets are used in a pyrolysis process or mild gasification process as for example described below char particles will be obtained as particles having substantially the same shape as the starting pellet.

The pyrolysis or mild gasification is preferably performed at so-called non-slagging conditions. This avoids the formation of slag and thus no special measures have to be taken for discharge of the slag and/or protection of the process equipment against the slag or molten slag. The latter enables one to use simpler process equipment. These non-slagging conditions are achieved by performing the process at a temperature of between 500 and 800° C. and at a solid residence time of between 10 and 60 minutes. The residence time will be chosen within the claimed range such that the reduction in atomic hydrogen over carbon (H/C) ratio of the solids in the pyrolysis or mild gasification process is greater than 50%, preferably greater than 70% and the reduction in atomic oxygen over carbon (O/C) ratio of the solids is greater than 80%. The char particles as obtained preferably have an atomic hydrogen over carbon (H/C) ratio of between 0.02 and 0.1 and an atomic oxygen over carbon (O/C) ratio of between 0.01 and 0.06.

The absolute pressure at which the pyrolysis or mild gasification and in optional subsequent process steps is performed may vary between 90 kPa and 10 MPa and preferably between 90 kPa and 5 MPa. Pressures at the higher end of these ranges are advantageous when the syngas is to be used in downstream processes which require a syngas having such elevated or even higher pressures. The lower pressure range may be used when the gaseous reaction products and/or the syngas as prepared from this reaction product is used as fuel for a gas engine or steam boiler to generate electricity. Lower pressures are advantageous when a char particle is desired having a higher active surface.

When the pyrolysis or mild gasification is performed at an elevated pressure the solids and an optional carrier gas will have to be brought to that pressure level before being able to feed this mixture to a reactor in which the process is performed. This pressurisation of the solid biomass may be performed in a lock hopper as described in U.S. Pat. No. 4,955,989 and US2011100274. Pressurisation may also be performed using a solids pump as for example described in U.S. Pat. No. 4,988,239 or US2009178336.

In the pyrolysis or mild gasification process a gaseous fraction comprising hydrogen, carbon monoxide and a mixture of gaseous organic compounds and a solid fraction comprising of char particles is obtained. The gaseous organic compounds may comprise of non-condensed organic compounds. These compounds range from methane to organic compounds having up to 50 carbons and even more. The organic compounds include hydrocarbons and oxygenated hydrocarbons. The fraction of these organic compounds in the gaseous fraction may be greater than 15 wt %. The gaseous fraction may also contain sulphur compounds, such as hydrogen sulphide, sulphinated hydrocarbons and chlorine containing compounds like hydrogen chloride and nitrogen containing compounds like ammonia and hydrogen cyanide. The amount of the latter compounds will depend on the composition of the feed material.

The pyrolysis process is performed at a temperature of between 500 and 800° C. and at a solid residence time of between 10 and 60 minutes. The pyrolysis process is performed in the absence of added oxygen. In that situation one refers to the process as a pyrolysis process. The required heat for performing the pyrolysis reaction is preferably generated by indirect heat exchange, for example via a mantle of the reactor in which the pyrolysis takes place.

Preferably the process is performed as a mild gasification process by contacting the pellets with an oxygen comprising gas at the reaction conditions. For example, the required temperature may then be achieved by a combination of indirect heat exchange, for example by means of flue gasses running through heating pipes or a heating mantle, and a partial oxidation of part of the gaseous fraction as generated in the process. The indirect heating may also be the indirect heating of the reactants of the process before they contact. If such partial oxidation reactions take place one does not refer to such a process as a pyrolysis process. Mild gasification will then be the better description. In such a mild gasification as performed at a temperature of between 500 and 800° C. and at a solid residence time of between 10 and 60 minutes the pellets of the solid torrefied biomass feed are contacted with an oxygen comprising gas. The mild gasification is advantageous compared to pyrolysis because less measures have to be taken to generate the required reaction temperature. Other advantages are increased devolatilization and improved char quality, in terms of less volatiles, due to a better heat distribution over the reactor and therefore an improved heat transfer. The char product as obtained preferably has a content of volatiles of less than 6 wt. %.

The mild gasification process may be performed by contacting the pellets of the solid biomass feed with an oxygen comprising gas and wherein the amount of oxygen is preferably between 0.1 and 0.3 mass oxygen per mass biomass.

The partial oxidation is preferably achieved by adding an oxygen comprising gas. The oxygen comprising gas may be oxygen, air or enriched air. The purity of the oxygen comprising gas is preferably at least 90 vol %, more preferably at least 94 vol %, wherein nitrogen, carbon dioxide and argon may be present as impurities. Substantially such pure oxygen is preferred, such as prepared by an air separation unit (ASU) or by a water splitter, also referred to as electrolysis.

Preferably wherein the mild gasification is performed in the presence of oxygen and steam. It has been found that when steam is also present the active surface area of the char particles is substantially higher Applicants found that when the mild gasification process is performed in the presence of oxygen and steam at a temperature of between 500 and 800° C. and at a solid residence time of between 10 and 60 minutes a char product may be obtained having a BET (N2) active surface areas of between 300 and 500 $m^2/g$ or even higher.

The amount of oxygen in such a process also involving steam is suitably between 0.1 and 0.4 kg per kg of the solid biomass feed. The content of oxygen in the combined oxygen steam fraction is suitably between 20 and 40 vol. % $O_2$ per combined $O_2$ and $H_2O$ at 300° C.

The process is preferably performed in a continuous process wherein the biomass feed is continuously fed to a reactor and contacted with the oxygen comprising gas. The temperature is maintained at the required level by indirect heat exchange in case a pyrolysis is performed or by partial oxidation in case of a mild gasification. In case of pyrolysis heating surfaces may be present in the reactor. The oxygen comprising gas as supplied to the reactor is preferably heated before contacting the pellets of the solid torrefied biomass in both the pyrolysis and the mild gasification embodiment. The temperature of the oxygen comprising gas as supplied to the reactor may be between 300 and 500° C. and wherein the temperature is so chosen that water is present as steam at the chosen pressure.

The reactor in both the pyrolysis as the mild gasification process is preferably performed in an elongated furnace wherein the biomass is continuously transported from a solids inlet at one end of an elongated furnace to a solids outlet at the other end of the elongated furnace. The elongated furnace is preferably a tubular furnace. The means to move the biomass along the length of the reactor may be by means of a rotating wall and/or by rotating means within the furnace. In case of a rotating wall a rotary kiln furnace may be used as for example described in DE19720417 and U.S. Pat. No. 5,769,007. Preferably a tubular elongated reactor is used having rotating means within the furnace. Such rotating means may be an axle positioned axially in the tubular reactor provided with radially extending arms which move the biomass axially when the axle rotates. More preferably such a reactor is further provided with two or more means to supply the oxygen comprising gas, optionally in admixture with steam, along the length of the elongated reactor and between the solids inlet and solids outlet. These inlets for gas are axially spaced apart.

In the process according to the invention it is therefore preferred to supply the oxygen comprising gas to the elongated reactor at two or more axially spaced apart positions along the length of the reactor between the solids inlet and the solids outlet.

The char particles as produced in this process are suitably separated from the gaseous fraction. This separation may be performed as a separate step and using any known solids-gas separation technique at high temperature, suitably between 600 and 1000° C., to avoid condensation of the heavy hydrocarbons. Also to sustain high energy efficiencies of a combined process also involving a downstream partial oxidation of the gaseous fraction as described below. Because the pellets are relatively large no special measures are required to separate the pellet particles from the gaseous fraction. The pellets are suitably separated from the gaseous fraction by means of simple gravitational forces. For example, the pellets may be obtained via a discharge at the lower end of a separator while the gaseous fraction is discharged at a higher elevation. Any entrained solids in this gaseous fraction may be separated by means of a cyclone. More preferably use is of filters, like candle filters.

The gaseous fraction as separated from the char product may be used as fuel in a combustion process, for example to prepare steam in a boiler or to generated electricity in a gas turbine. The combustion process may also be a power generating process comprising of contacting the fuel with oxygen containing gas having an oxygen content of above 90 vol. %. In such an oxy-process a concentrated carbon dioxide flue gas is obtained which may be stored or used as a chemical feedstock.

The gaseous fraction as separated from the char product is preferably used as feedstock in a partial oxidation process to prepare syngas. In such a process the gaseous fraction is subjected to a partial oxidation. The partial oxidation is performed in the absence of the char products. In the partial oxidation the C1 and higher hydrocarbons and possible oxygenates as present in the gaseous fraction are mainly converted to hydrogen and carbon monoxide thereby obtaining a syngas containing no or almost no tars. The gaseous fraction is subjected to a partial oxidation at a temperature of between 1000 and 1600 C and preferably between 1100 and 1600 C, more preferably between 1200 and 1500° C., and at a residence time of less than 5 seconds, more preferably at a residence time of less than 3 seconds. The residence time is the average gas residence time in the partial oxidation reactor. The partial oxidation is performed by reaction of oxygen and optionally in the presence of steam, with the organic compounds as present in the gaseous fraction, wherein a sub-stoichiometric amount of oxygen relative to the combustible matter as present in the gaseous fraction is used.

The oxygen comprising gas used in the partial oxidation of the gaseous fraction is suitably of the same composition as the oxygen comprising gas as described for the mild gasification above. The total amount of oxygen fed to a mild gasification and to the partial oxidation of the gaseous fraction is preferably between 0.1 and 0.6 mass oxygen per mass biomass as fed to the mild gasification and more preferably between 0.2 and 0.5 mass oxygen per mass biomass as fed to the mild gasification.

A suitable partial oxidation process for is for example the Shell Gasification Process as described in the Oil and Gas Journal, Sep. 6, 1971, pp. 85-90. In such a process the gaseous fraction and an oxygen comprising gas is provided to a burner placed at the top of a vertically oriented reactor vessel. Publications describing examples of partial oxidation processes are EP291111, WO9722547, WO9639354 and WO9603345.

The syngas as obtained in the partial oxidation will have an elevated temperature. Suitably this syngas mixture is contacted with a carbonaceous compound to chemically quench the syngas mixture. By directly contacting the syngas mixture with a carbonaceous compound an endothermic reaction will take place thereby reducing the temperature of the resulting gas mixture. For this reason, the term chemical quenching is used. For example, methane will react according to the following reaction:

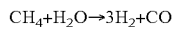

$$CH_4 + H_2O \rightarrow 3H_2 + CO$$

The carbonaceous compound may be any compound which readily reacts at the temperature of the syngas to hydrogen and carbon monoxide. The carbonaceous compound is preferably a hydrocarbon and more preferably a hydrocarbon having 1 to 5 carbon atoms. More preferably the hydrocarbon is methane. Methane may be added as such or more suitably as part of a natural gas mixture or biomass derived gas. Such gas mixtures will comprise mostly of methane, suitably more than 80 vol. %. The natural gas may be added as liquefied natural gas (LNG). The hydrocarbon compounds may suitably be by-products of any downstream process which use the syngas as feedstock.

Suitably the temperature of the syngas is reduced in such a chemical quench from a temperature in the range of between 1100 and 1600° C. to a temperature of between 800 and 1200° C., more preferably to a temperature of between 1000 and 1200° C. The chemical quench performed at these temperature ranges will be preferably performed in the absence of a catalyst and is referred to as high temperature quench.

The chemical quench may be performed by simply injecting the hydrocarbon compounds in a stream of the syngas mixture obtained in the partial oxidation. This may be spraying liquid hydrocarbon droplets into such a gaseous stream. Preferably the hydrocarbons are injected as a gas.

The hot product gasses as obtained in the partial oxidation or after the high temperature quench may still require further reduction in temperature. This may be achieved by indirect heat exchange in an adjacent boiler as for example described in WO07131975 and US2007267171. In such a boiler steam and superheated steam may be produced. Preferably this steam may be used to provide indirect heat in the pyrolysis process or may be mixed with oxygen in the preferred mild gasification process described above. The syngas gas obtained in the partial oxidation, optionally after a chemical quench, may also be reduced in temperature by a direct quench with water. Combinations of the above direct and indirect temperature reducing processes are also possible. Such processes may be followed by the above described low temperature quench.

The syngas mixture as prepared by the above process may be directly used as fuel for example to generate electricity. The syngas mixture may be subjected to a water gas shift reaction to convert part of all of the carbon monoxide to carbon dioxide and water to hydrogen. Such a water gas shift reaction could be beneficial to increase the hydrogen to carbon monoxide ratio as required in downstream processes or to produce hydrogen. The hydrogen can for example be used as fuel for fuel cells, fuels for hydrogen powered combustion engines and gas turbines or it can be mixed into the natural gas grid. Preferably the obtained syngas mixture is used as feedstock in various processes to make chemicals and fuels, such as the Fischer-Tropsch process, methanation process, methanol process, acetic acid process, ammonia process and the DME process.

The char product may be further activated to obtain activated carbon. Activation may be performed by means of a carbonization process, oxidation process or by a chemical activation or by combinations of these processes. The process may be a carbonization process wherein the char particles are heated to a temperature of between 800 and 1000° C. in an inert atmosphere. In this process pyrolysis takes place. The inert atmosphere may be achieved using gases like for example argon or nitrogen. The activation may also be by means of an oxidation process wherein the char particles are contacted with steam and/or oxygen at a temperature of between 700 and 1200° C. Preferably only steam is used because such a process is more stable. The gasses as produced in such an oxidation activation may contain hydrogen and carbon monoxide which may be combined with the syngas as obtained by the process of this invention. Preferably the activation in is an oxidation process wherein the char particles are contacted with steam which is obtained by evaporation of water in an indirect reduction of temperature of the syngas mixture having an elevated temperature as obtained in the partial oxidation process. This allows one to use steam produced in the partial oxidation process in an advantageous manner. Chemical activation may be used to obtain even more improved activated carbon. In this process the char particles are impregnated with one or more chemicals, like for example phosphoric acid, potassium hydroxide, sodium hydroxide, calcium chloride or zinc chloride. The impregnated char particles are subsequently carbonized at a temperature of between 450 and 900° C. A disadvantage of the chemical activation is the usage of chemicals and the resulting chemical waste.

The activated carbon as obtained after activation of these char particles have excellent properties in terms of BET surface area, water content and carbon content making this product a valuable product of this process. Activated carbon having a BET ($N_2$) surface areas of above 700 $m^2/g$, moisture content of below 0.8 wt. % and even below 0.6 wt. % and carbon content of above 85 wt. % and even 90 wt. % have been prepared by this process starting from the solid torrefied biomass.

The invention will be illustrated making use of the following FIG. 1. FIG. 1 shows a process line up suited for the process according to the invention. Via stream 1 a solid biomass feed discharged from a biomass feed tank 2. The solid biomass feed is fed to a tubular furnace 5. To this furnace oxygen is fed via stream 3 along the length of the reactor at more than one spaced apart positions. In tubular furnace 5 the required heat is provided by the partial oxidation of the hydrocarbon gaseous fraction with the oxygen which is generated under the mild gasification conditions in furnace 5 and optionally further heated by indirect heat exchange using steam 19. The pellets are moved from a solids inlet 5a to a solids outlet 5b by means of a rotating axle 6 provided with arms which move the pellets in the axial direction. At the end of the furnace 5 the char particles are separated from the gaseous fraction by gravitation wherein the solids drop to a solid outlet 10 in a vessel 4 and the gaseous fraction leaves this vessel via gas outlet tube 7.

The separation vessel 4 is provided with a gas outlet tube 7. Through the gas outlet tube 7 the gaseous fraction comprising hydrogen, carbon monoxide and a mixture of gaseous hydrocarbons is discharged from the vessel via stream 9. The vessel 4 is provided with a solids outlet 10 at the bottom of the vessel 4 through which the char particles are discharged via stream 11. When the furnace 5 is operated at elevated pressures a sluice system may be present at this point to discharge the char particles from the high pressure furnace level to ambient pressure conditions.

The gaseous fraction in stream 9 may still comprise some solid particles. These particles may be separated from the gaseous fraction in a second cyclone separator 12. The solids as separated in stream 13 may be combined with the solids obtained in vessel 4 of stream 11 as shown. The obtained cleaned gaseous fraction in stream 14 is provided to a burner 15 of a partial oxidation reactor 16. To said burner also an oxygen comprising gas is fed via stream 17 and optionally a moderator gas, like steam (not shown). The hot syngas mixture as obtained in reactor 16 is contacted by injecting methane as supplied in stream 16a into stream 16b to perform the chemical quench. The thus cooled syngas is further reduced in temperature by introducing the syngas to the tube 18 side of a sensible heat boiler 17. In the sensible heat boiler 17 water evaporates to obtain steam which is discharged from the boiler via stream 19. The steam as obtained or a super-heated steam which may be obtained when a special boiler is used may be used as carrier gas. The syngas mixture is cooled and discharged via stream 20.

The above process is advantageous because it can prepare a syngas in a simple process starting from a biomass feed. The biomass is hereby subjected to at least two subsequently performed biomass preparation processes, namely torrefaction and pyrolysis. These preparation processes are known from the earlier referred to article of Jean-Marie Seiler et al. in Energy as alternative processes to prepare biomass as feed for a gasification process. In the process according to the invention these preparation processes are used to convert the solid biomass to a useful char product while also obtaining a gaseous mixture which can be easily converted to syngas by gasification. The process avoids the use of a heat carrier like the alpha-alumina particles. Furthermore, the syngas as prepared does not contain or at least not in any significant amount any higher hydrocarbons. This is achieved by performing a partial oxidation at the described elevated temperature followed by the chemical quench. The chemical quench is advantageous because the syngas mixture is reduced in temperature and additional hydrogen and carbon monoxide is formed. When a lower carbon number hydrocarbon compound as the carbonaceous compound is used in the chemical quench, like methane, relatively more hydrogen is formed. This results in an increase in the hydrogen to carbon monoxide molar ratio which makes the syngas more suitable as feedstock for various chemical processes. Such a formation of hydrogen is especially favoured at the relatively high temperatures of the syngas mixture according to the invented process. A further advantage of the chemical quench is that the water reacts with the added hydrocarbon compound at these elevated temperatures. Thus, a dehydration results, which avoids or limits any required dehydration of the syngas mixture.

The invention will be illustrated by the following non-limiting examples.

EXAMPLE 1

To one end of an elongated tube reactor 70 kg/h torrefied feedstock was continuously fed. The torrefied feedstock was pelletised torrefied wood having a cylindrical shape. The properties of the feedstock are listed in Table 1. The reactor had an internal diameter of 0.6 m and was provided with an axial mixing means which slowly moved the feedstock and the solid reaction products in an axial direction and over a length of 1.1 m to a solids outlet provided at the other end of the tubular reactor.

TABLE 1

| | |
|---|---|
| Average pellet dimensions: length (cm) (length, diameter) | 6 |
| Average pellet dimensions: diameter (mm) | 8 |
| Bulk density (kg/m3) | 0.35 |
| content of volatiles (wt %) | 70 |
| atomic hydrogen over carbon (H/C) ratio | 0.55 |

The pressure in the tubular reactor was 0.1 MPa. The start temperature in the reactor was 520° C. and achieved by electrical heating of the tubular wall of the reactor. The solid residence time was between 15 and 20 minutes.

The gaseous effluent and the solids leaving the reactor were collected separately. The solids were analysed and their properties and char yields are listed in Table 2.

EXAMPLE 2

Example 1 was repeated except that the temperature in the reactor was achieved by feeding hot air at three axially spaced positions along the length of the reactor. The total air flow was 20-25 Nm3/hour. The temperature of the air was 300° C. The achieved temperature varied (see Table 2). The solids residence time was as in Example 1. The char yield and solids composition are listed in Table 3.

EXAMPLE 3

Example 1 was repeated except that the temperature in the reactor was achieved by feeding a mixture consisting of oxygen and steam at three axially spaced positions at a feed temperature 300° C. The oxygen content was 24 vol. %. The achieved temperature varied (see Table 2). The solids residence time was as in Example 1.

The solids were analysed and their properties and yields are listed in Table 2. In Table 3 some additional process conditions and results are listed.

TABLE 2

| | Example 2 | Example 2 | Example 2 | Example 3a | Example 3b | Example 3c |
|---|---|---|---|---|---|---|
| Heating | electrical | Air | Air | Steam/Oxygen | Steam/Oxygen | Steam/Oxygen |
| Reactor temperature | 520 | 640 | 680 | 520 | 622 | 640 |
| Biomass flow (kg/h) | | | | 70 | 70 | 62 |
| Pyrolysis gas production (kg/kg feedstock) | | | | 1.3 | 1.3 | 1.4 |

TABLE 2-continued

|  | Example 2 | Example 2 | Example 2 | Example 3a | Example 3b | Example 3c |
|---|---|---|---|---|---|---|
| Yield char particles (kg/kg feedstock) | 0.28 | 0.26 | 0.22 | 0.21 | 0.17 | 0.14 |
| BET surface area (m2/g) | 238 | 128 | 88 | 377 | 387 | 440 |
| C (wt %) | 88.4 | 91.4 | 91.9 | 87.1 | 90.5 | 88.5 |
| H (wt. %) | 1.5 | 0.6 | 0.6 | 1.2 | 1.0 | 1.1 |
| O (wt %) | 1.0 | 0.6 | 0.5 | 3.2 | 0.9 | 2.2 |
| Ash (wt %) | 5.7 | 6.6 | 6.0 | 6.6 | 6.9 | 7.9 |
| Volatiles (wt %) | 9.6 | 2.3 | 2.4 | 4.2 | 3.9 | 5.1 |

TABLE 3

|  | Example 3a | Example 3b | Example 3c |
|---|---|---|---|
| Heating | Steam/Oxygen | Steam/Oxygen | Steam/Oxygen |
| Reactor temperature | 520 | 622 | 640 |
| Biomass flow | 70 | 70 | 62 |
| O2/biomass (kg/kg) | 0.17 | 0.17 | 0.17 |
| O2/(H2O + O2) (expressed in vol. % at 300 C.) | 24 | 24 | 22 |
| Yield char particles (kg/kg feedstock) | 0.21 | 0.17 | 0.14 |
| Char analysis: |  |  |  |
| BET surface area (m2/g) | 377 | 387 | 440 |
| C (wt %) | 87.1 | 90.5 | 88.5 |
| H (wt %) | 1.2 | 1.0 | 1.1 |
| O (wt %) | 3.2 | 0.9 | 2.2 |
| Ash (wt %) | 6.6 | 6.9 | 7.9 |
| Volatiles (wt %) | 4.2 | 3.9 | 5.1 |

EXAMPLE 4

The gaseous mixture obtained in Examples 3a-3c were partially oxidised to a syngas mixture of carbon monoxide and hydrogen at 0.1 MPa. The composition of the obtained syngas mixture and conditions of the partial oxidation are listed in Table 4. The listed yield was 1.5-1.7 kg syngas per kg biomass fed to the mild gasification process.

TABLE 4

| Experiment | 3a | 3b | 3c |
|---|---|---|---|
| Syngas yield (kg/kg biomass feedstock) | 1.5 | 1.6 | 1.7 |
| Syngas composition |  |  |  |
| Hydrogen (vol. %) | 23.7 | 23.7 | 23.7 |
| Carbon Monoxide (vol. %) | 20.7 | 21.7 | 21.7 |
| Carbon dioxide (vol. %) | 19.5 | 19.6 | 19.6 |
| Water (vol. %) | 34.6 | 33.9 | 33.9 |
| Methane (vol. %) | 1.5 | 1.2 | 1.2 |
| Lower heating value (MJ/Nm3) | 5.7 | 5.7 | 5.7 |

The invention claimed is:

1. A process to prepare a char product the method comprising mild gasification of a solid biomass feed,
thereby obtaining a gaseous fraction comprising hydrogen, carbon monoxide and a mixture of gaseous organic compounds and a solid fraction comprising char particles having a reduced atomic hydrogen over carbon ratio and a reduced oxygen over carbon ratio relative to the solid biomass feed;
wherein the solid biomass feed are pellets of a solid torrefied biomass feed having a content of volatiles of between 50 and 75 wt %; and
wherein the mild gasification is performed at a temperature of between 50° and 800° C. and at a solid residence time of between 10 and 60 minutes and in the presence of oxygen and steam.

2. The process according to claim 1, wherein the mild gasification is performed in an elongated reactor wherein the biomass is continuously transported from a solids inlet at one end of an elongated reactor to a solids outlet at the other end of the elongated reactor.

3. The process according to claim 1, wherein the solid biomass feed is subjected to a mild gasification by contacting the solid biomass feed with an oxygen comprising gas and wherein the amount of oxygen is between 0.1 and 0.3 mass oxygen per mass biomass.

4. The process according to claim 3, wherein the oxygen comprising gas is air.

5. The process according to claim 1, wherein the amount of oxygen is between 0.1 and 0.3 kg per kg of the solid biomass feed and wherein the content of oxygen is between 20 and 40 vol. % $O_2$ per combined $O_2$ and $H_2O$ at 300° C.

6. The process according to claim 2, wherein oxygen comprising gas is supplied to the elongated reactor at two or more axially spaced away positions along the length of the reactor between the solids inlet and the solids outlet.

7. The process according to claim 1, wherein in the mild gasification the hydrogen over carbon (H/C) ratio is reduced by more than 70% and the atomic oxygen over carbon (O/C) ratio is reduced by more than 80% when comparing the pellets of a solid torrefied biomass and the char particles.

8. The process according to claim 1, wherein the char product has a BET ($N_2$) surface area of between 300 and 500 $m^2/g$.

9. The process according to claim 1, wherein the gaseous fraction comprising hydrogen, carbon monoxide and a mixture of gaseous organic compounds is subjected to a continuously operated partial oxidation at a temperature of between 110° and 1600° C.

10. The process according to claim 9, wherein a syngas mixture obtained in the partial oxidation is contacted with a carbonaceous compound to chemically quench the syngas mixture.

11. The process according to claim 1, wherein the char product is separated from the gaseous fraction and activated to obtain an activated carbon product having a BET ($N_2$) surface area of above 700 $m^2/g$.

* * * * *